United States Patent [19]

O'Rourke

[11] Patent Number: 5,092,272
[45] Date of Patent: Mar. 3, 1992

[54] TUG TOY FOR DOGS

[76] Inventor: Anthony O'Rourke, 27420 Winding Way, Malibu, Calif. 90265

[21] Appl. No.: 655,140

[22] Filed: Feb. 14, 1991

[51] Int. Cl.⁵ ............................................. A01K 15/00
[52] U.S. Cl. ..................... 119/29; 446/236; 446/490
[58] Field of Search ................. 119/29, 29.5; 446/236, 446/490

[56] References Cited

U.S. PATENT DOCUMENTS

| | | | |
|---|---|---|---|
| 1,149,170 | 8/1915 | Allis | 119/29 |
| 2,032,871 | 3/1936 | Dammeyer | 446/490 |
| 3,476,086 | 11/1969 | Way | 119/29 |
| 4,267,685 | 5/1981 | Cragin | 119/29 |
| 4,924,811 | 5/1990 | Axelrod . | |
| 4,948,137 | 8/1990 | Alvarez | 119/29 X |

Primary Examiner—Gene Mancene
Assistant Examiner—R. Thomas Price
Attorney, Agent, or Firm—Lyon & Lyon

[57] ABSTRACT

A therapeutic animal tug toy comprising a length of cotton rope which is woven so as to define a closed loop handle, a shaft portion extending from the loop handle and a pair of tail portions extending from the shaft portion. The tail portions each define a knot therein proximate their extended ends. A cylindrical handle member is disposed about a portion of the closed loop handle whereby upon a person gripping the handle member and one or two animals gripping and tugging on one or both of the tail portions, the toy provides playful exercise, cleaning of the animal's teeth and massaging of the animal's gums, and upon twisting of the toy, the handle member maintains the loop handle in a loop configuration to protect the person's hand disposed thereon. In an alternate embodiment of the tug toy adapted for use with only a single dog at one time, the rope is woven so as to define a closed gripping loop extending from the shaft portion in lieu of a pair of tail portions.

8 Claims, 2 Drawing Sheets

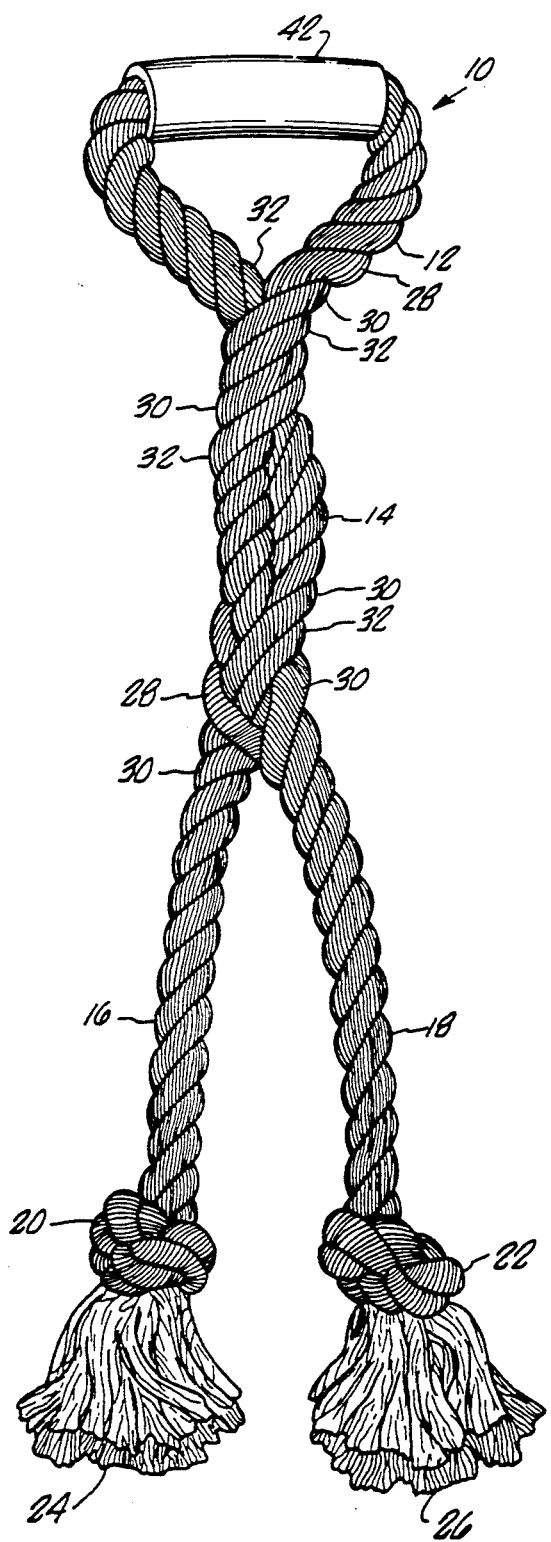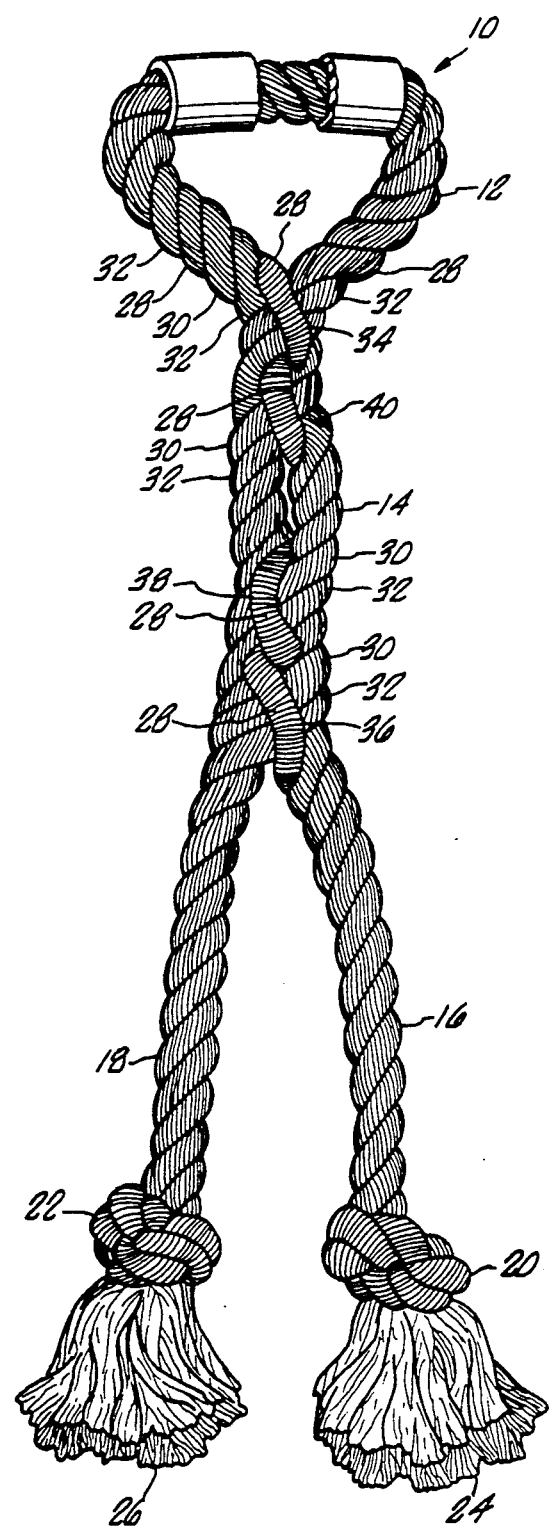

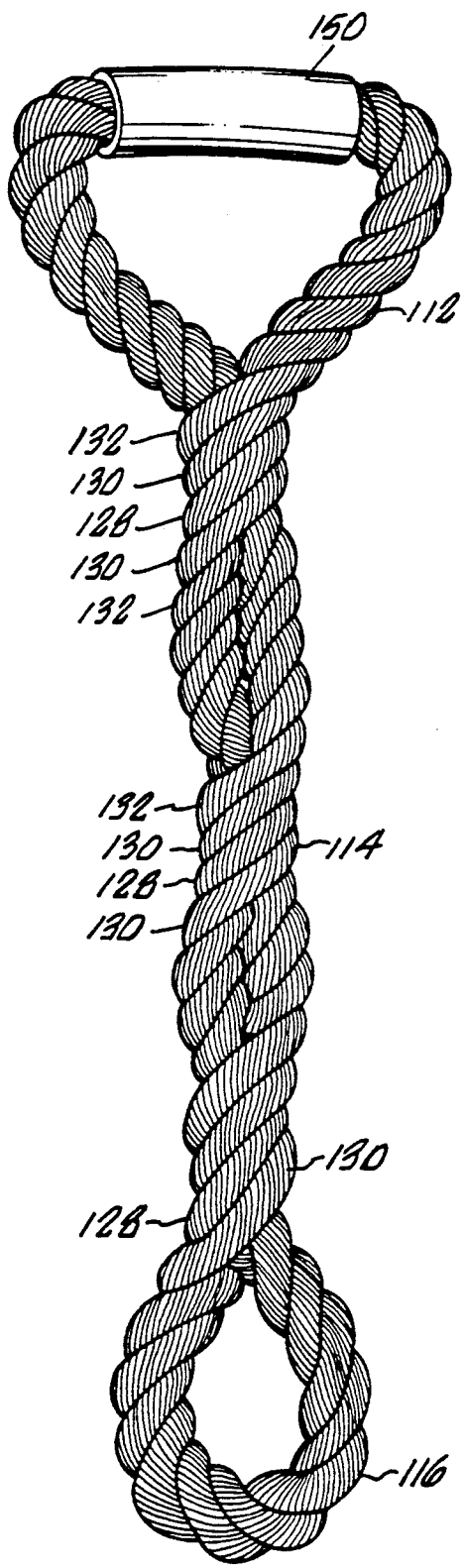
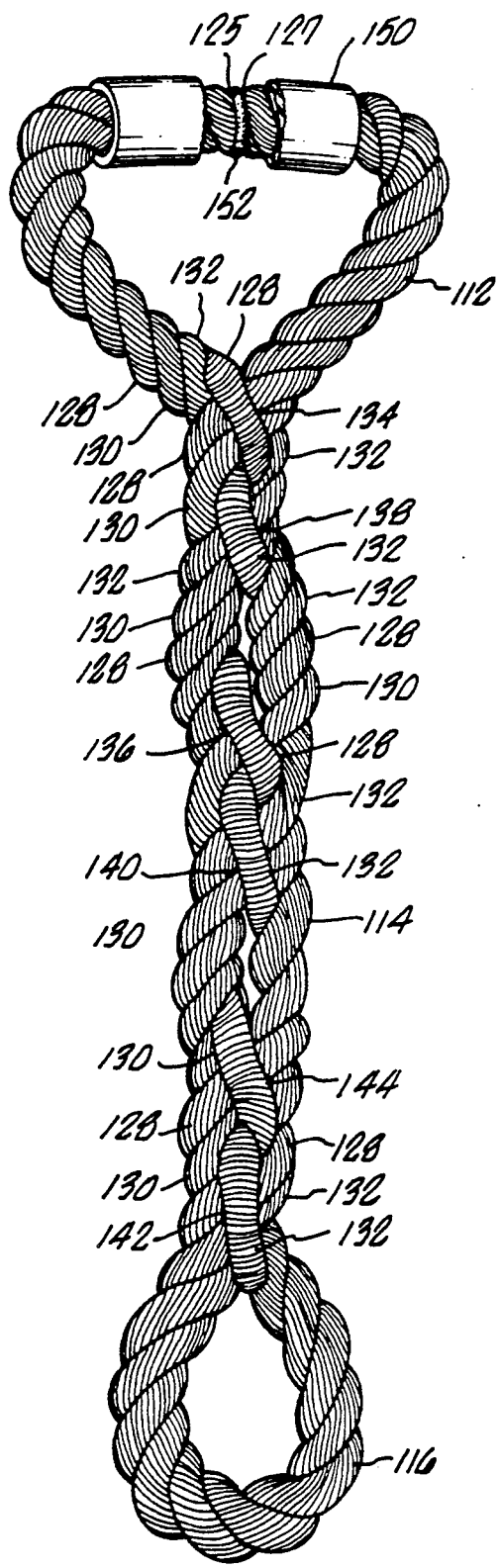

5,092,272

TUG TOY FOR DOGS

BACKGROUND OF THE INVENTION

The present invention relates to a therapeutic animal toy particularly adapted for use by dogs and more particularly, to a dog tug toy. Various types and configurations of dog toys have been known and widely used for years. Examples of dog tug toys are found in U.S. Pat. Nos. 3,476,086 and 3,830,202. Examples of dog chew toys are the conventional rawhide bone and chewable objects having flavor or odor extract incorporated therein as seen in U.S. Pat. No. 4,771,733. Tug toys have proved to be very popular with dogs and provide beneficial playful exercise for dogs. Chew toys are also very popular and not only occupy the dogs' time and satisfy their desire to chew, but are beneficial to proper jaw and teeth development.

Recently, applicant developed a cotton-rope Chew toy marketed by applicant under the trademark, Booda Bones. While satisfying the chewing urge and being more durable than conventional rawhide bones, the Booda Bones chew toy provides both a flossing action on the dogs' teeth to gently clean the teeth and massages the gums, thereby preventing tartar build-up and Periodontal. While the cotton-rope Booda Bone toy provides substantial therapeutic benefits for dogs, the nature of the product itself as a chew toy does not lend itself to exercising the dog, other than its jaw. Conversely, the tug toys previously available do not provide the tooth cleaning and gum massaging benefits of the Booda Bone chew toy. In addition, such tug toys were not properly configured so as to be easily and comfortably gripped and held by a person while being tugged and twisted by the dog. The tug toy of the present invention combines the body exercising benefits of a tug toy with the therapeutic benefits of applicant's Booda Bones chew toy while being configured so as to be readily and comfortably held while a dog is vigorously tugging and twisting the device. In one embodiment of the invention, the device can be used by two dogs concurrently and comfortably held by one person.

SUMMARY OF THE INVENTION

Briefly, the present invention comprises a therapeutic animal tug toy particularly adapted for use with dogs. The toy is constructed of a single length of conventional cotton rope and is woven so as to define a closed loop handle at one end thereof and a shaft portion extending from the loop. In one embodiment of the invention adapted for use with one or two dogs concurrently, the shaft portion of the toy bifurcates into two extended tail portions, each terminating in a large knot adjacent its extended end. A cylindrical rubber hand gripping member is disposed about the extended end of the closed loop handle which is adapted to be held within one hand by the user so that when one or two dogs grip the knotted ends of the tail portions of the toy and tug on and twist the toy, the person handling the dogs can readily and comfortably hold onto the toy by its cylindrical handle. The cylindrical handle also prevents the handle loop portion of the toy from being twisted and tightened about the user's hand during use. As the dogs tug and chew against the knotted ends of the tail portions of the toy, they not only obtain the helpful benefits of such playful exercise, but the soft cotton rope concurrently flosses their teeth and massages their gums. In addition, the knotted ends of the tail portions of the toy enable the dogs better to grip the toy and tug against the user.

In an alternate embodiment of the device adapted for use with a single dog, the woven shaft portion of the toy is extended and defines a single closed gripping loop at the extended end opposite the handle loop end in lieu of the bifurcated tail portions of the prior embodiment. The closed gripping loop while being adapted only for use with a single dog at one time, provides an even superior teeth-cleaning and gum-massaging action for the dog.

It is the principal object of the present invention to provide an improved tug toy for dogs.

It is another object of the present invention to provide a tug toy for dogs which is of a durable construction and provides a gentle cleaning of the dog's teeth and massaging of its gums during use.

It is a further object of the present invention to provide a tug toy for dogs which protects the hand of the user as the toy is tugged and twisted by the dog.

It is yet another object of the present invention to provide a tug toy for dogs which is of simple construction and economic to manufacture.

It is a still further object of the present invention to provide a tug toy for dogs which is adaptable for use by two dogs concurrently.

These and other objects and advantages of the present invention will become readily apparent from the following detailed description taken in conjunction with the accompanying drawings.

IN THE DRAWINGS

FIG. 1 is a front plan view of a first embodiment of the present invention.

FIG. 2 is a rear plan view of the first embodiment of the present invention with a portion of the handle broken away.

FIG. 3 is a front plan view of a second embodiment of the present invention.

FIG. 4 is a rear plan view of the second embodiment of the present invention with a portion of the handle broken away.

DESCRIPTION OF THE PREFERRED EMBODIMENTS

Referring now in detail to the drawings, the dog tug toy 10 of the present invention is comprised of a single length of cotton rope which is woven together as seen in FIGS. 1 and 2 to define a closed loop handle portion 12 at one end, a shaft portion 14 extending from the loop handle 12, and a pair of tail portions 16 and 18 projecting from shaft portion 14. Large knots 20 and 22 are formed in the tail portions 16 and 18 adjacent the frayed ends 24 and 26 thereof. The cotton rope of which toy 10 is comprised is preferably of standard configuration comprising three inner-woven cords 28 30 and 32 with each cord being comprised of a large number of thin cotton strands.

To close the loop handle 12 and form the shaft and tail portions of the toy, one of the cords, i.e., 28, is looped over itself and the other two cords 30 and 32 at 34, 36, 38 and 40, as seen in FIG. 2, whereupon pulling on the tail portions of the toy merely tends to tighten the weave which defines the structure of the toy as opposed to separating or loosening the weave. Accordingly, the aforesaid construction defines a very durable and strong yet soft rope tug toy which can be held by the loop handle 12 and chewed, tugged and twisted by one or two large dogs with their jaws clinched about the tail portions 16 and 18 of the toy 10 without damaging or inflicting deleterious wear on the toy. While engaging in such playful exercise, the soft cotton tail portions of the toy clean the dogs' teeth and massage their gums.

A cylindrical rubber handle 42 is disposed about a portion of the loop handle 12 of the toy 10 both to provide to convenient and comfortable gripping surface for the user and to prevent the rope loop handle from collapsing and twisting tightly about the user's hand during use. Knots 20 and 22 disposed adjacent the ends 24 and 26 of tail portions 16 and 18 not only prevent the woven rope from unravelling but define large stop members which, during use, are engaged by the dog's teeth and enable the dog or dogs to tug more vigorously against the toy without the tail portions thereof sliding through the dog's jaw.

A second embodiment of the tug toy is illustrated in FIGS. 3 and 4. Toy 100 is also comprised of a single length of the same woven cotton rope material as toy 10 and defines a closed loop handle 112 at one end, a shaft portion 114 extending from the loop handle 112 and a closed gripping loop 116 extending from the distal end of shaft portion 114. Unlike tug toy 10, tug toy 100 is designed for use with only one dog at a time and thus employs a single gripping loop 116 in lieu of the two tail portions of the prior embodiment.

In tug toy 100, the ends 125 and 127 of the cotton rope are positioned at the extended end of loop handle 112 and one of the three woven cords comprising the length of rope, are woven such that cord 128 is woven about itself and cords 130 and 132 at 134 and 136, cord 132 is woven about itself and cords 128 and 132 at 138, 140 and 142 and cord 130 is woven about itself and cords 128 and 130 at 144 as seen in FIGS. 3 and 4. This weaving pattern, as the weaving pattern in the prior embodiment, can be varied without departing from the scope of the invention. The cylindrical rubber handle 150 is slidably disposed over one of ends 125 or 127 of the rope and the two ends are glued together in an abutting relationship with a hot melt adhesive 152 and the handle 150 is then slidably disposed about the adhesive thereby closing the loop handle 112 and securing the handle member 150 in place at the extended end of tug toy 100.

Various other changes and modifications may be made in carrying out the present invention without departing from the spirit and scope thereof. Insofar as these changes and modifications are within the purview of the appended claims, they are to be considered as part of the present invention.

I claim:

1. A therapeutic tug toy comprising a length of soft, durable material and formed of a plurality of cords of said material woven together so as to define a closed loop handle at one end thereof, an interwoven shaft portion extending from said loop handle and terminating in a pair of tail portions extending from said shaft portion such that pulling on said pair of tail portions with respect to said loop handle tightens the weave of said shaft portion, said pair of tail portions each defining a large gripping know therein proximate the end thereof, and a cylindrical handle member disposed about a portion of said closed loop handle whereby upon a person gripping said handle member and one or two animals gripping and tugging on one or both of said pair of tail portions, the cords in said shaft portion are drawn together to prevent unraveling of the toy and said toy provides playful exercise, cleaning of the animal's teeth and massaging of the animal's gums.

2. The toy of claim 1 wherein said cylindrical handle member is constructed of a rubber material and maintains said loop handle in an open configuration upon an animal tugging on and twisting said toy to protect a person's hand disposed thereon.

3. The toy of claims 1 or 2 wherein said rope is comprised of cotton.

4. A therapeutic animal tug toy comprising a single length of cotton rope, said rope being woven so as to define a closed loop handle at one end thereof, and inter-woven shaft portion extending from said loop handle and terminating in a pair of tail portions extending from said shaft portion such that pulling on said pair of tail portions with respect to said loop handle tightens the weave of said shaft portion, said pair of tail portions each defining a large gripping knot therein proximate the end thereof, and a cylindrical handle member disposed about a portion of said closed loop handle whereby upon a person gripping said handle member and one or two animals gripping and tugging on said one or both of said pair of tail portions, said weave in said shaft portion is tightened to prevent unraveling of the toy and said toy provides playful exercise, cleaning of the animal's teeth and massaging of the animal's gums and upon an animal twisting said toy, said handle member maintains said loop handle in a loop configuration protecting a person's hand disposed thereon.

5. A therapeutic tug toy comprising a length of soft, durable material and formed of a plurality of cords of said material woven together so as to define a loop handle, the ends of said length of material being disposed in said loop handle in an abutting relations, an inter-woven shaft potion extending from said loop handle and terminating in a closed gripping loop extending from said shaft portion such that pulling on said gripping loop with respect to said loop handle tightens the weave of said shaft portion, adhesive means securing together the ends of said length of material to close said loop handle, and a cylindrical handle member disposed about said adhesive means and said ends of said length of material whereby a person gripping a handle member and an animal gripping said gripping loop and tugging thereon, said plurality of cords in said shaft portions are drawn tightly together while said toy provides playful exercise, cleaning of the animal's teeth and massaging of the animals's gums.

6. The toy of claim 5 wherein said cylindrical handle member is constructed of rubber material and maintains said loop handle in an open configuration upon an animal tugging on and twisting said toy to protect a person's hand disposed thereon.

7. The toy of claims 5 or 6 wherein said length of material is comprised of cotton.

8. A therapeutic animal tug toy comprising a single length of cotton rope, said rope being woven so as to define a loop handle at one end thereof, an inter-woven shaft portion extending from said loop handle and terminating in a closed gripping loop extending from said shaft portion such that pulling on said gripping loop with respect to said loop handle tightens the weave of said shaft portion, the ends of said rope being disposed in said loop handle in an abutting relationship, adhesive means securing said ends together to close said loop handle, and a cylindrical handle member disposed about said adhesive means and said ends of said rope material whereby upon a person gripping said handle member and an animal gripping said gripping loop and tugging thereon, the weave in said shaft portion is tightened and said toy provides playful exercise, cleaning of the animal's teeth and massaging of the animal's gums and upon an animal twisting said toy, said handle member maintains said loop handle in a loop configuration protecting a person's hand disposed thereon.

* * * * *